United States Patent [19]

Sato et al.

[11] Patent Number: 4,670,965

[45] Date of Patent: Jun. 9, 1987

[54] AUTOMATIC TOOL EXCHANGE APPARATUS

[75] Inventors: Mitsuharu Sato; Sakashi Adachi; Izumi Kimura; Shigeo Sugiyama, all of Numazu, Japan

[73] Assignee: Toshiba Kikai Kabushiki Kaisha, Tokyo, Japan

[21] Appl. No.: 762,917

[22] Filed: Aug. 5, 1985

[30] Foreign Application Priority Data

May 31, 1985 [KR] Rep. of Korea ............ 85-3794

[51] Int. Cl.[4] .................................. B23Q 3/157
[52] U.S. Cl. ........................... 29/568; 29/26 A
[58] Field of Search ........... 29/568, 26 A; 408/31, 408/35

[56] References Cited

U.S. PATENT DOCUMENTS

| 3,822,466 | 7/1974 | Noguchi et al. | 29/568 |
| 4,012,830 | 3/1977 | Ewertowski | 29/568 |
| 4,126,233 | 11/1978 | Jeske | 29/568 |
| 4,141,134 | 2/1979 | Zettler et al. | 29/568 |
| 4,459,737 | 7/1984 | Mori et al. | 29/568 |

FOREIGN PATENT DOCUMENTS

| 135805 | 5/1979 | Fed. Rep. of Germany | 29/568 |
| 737192 | 5/1980 | U.S.S.R. | 29/568 |

*Primary Examiner*—Gil Weidenfeld
*Assistant Examiner*—Daniel W. Howell

[57] ABSTRACT

In apparatus for exchanging tools between a tool magazine having a plurality of tool pots and the spindle of a machine tool, wherein the axes of the tool pots are perpendicular to the axis of the spindle, there are provided a tool exchange arm having tool holding means on both ends, an arm supporting device having an arm driving mechanism for rotating the tool exchange arm and reciprocating the same toward and away from a rotary shaft provided for the arm supporting device, an actuator for swinging the arm supporting device about a pivot shaft, and an actuator for reciprocating the arm supporting device in a direction perpendicular to the pivot shaft.

2 Claims, 31 Drawing Figures

FIG. 6(III)

FIG.6(VII)

FIG.6(VIII)

FIG.6(XII)

FIG. 6(XIII)

FIG. 6(XIV)

FIG.9(III)

FIG.9(VII)

FIG.9(VIII)

AUTOMATIC TOOL EXCHANGE APPARATUS

BACKGROUND OF THE INVENTION

This invention relates to automatic tool exchange apparatus, and more particularly to apparatus for exchanging a tool between the spindle of a machine tool and a tool magazine containing a number of tools received in tool pots.

Where a tool magazine is installed on one side of the column of the machine tool with the axes of the tool pots directed orthogonal to the axis of the spindle of the machine tool, the tool exchange between the tool magazine and the machine tool must relay upon complicated mechanisms for avoiding interference between tools. Among these may be mentioned a mechanism utilizing an intermediate arm and an intermediate pot in addition to a tool exchanging arm, and a mechanism for swinging the axis of a tool pot indexed to the tool exchange position to a position parallel to the axis of the spindle of the machine tool.

Since such prior art tool exchange apparatus are not only complicated in construction because of the intermediary of an intermediate arm and an intermediate pot but also require larger number of operation steps thus increasing the tool exchange time. Moreover, to swing the tool pots, complicated tool magazine must be used.

SUMMARY OF THE INVENTION

It is an object of this invention to provide an improved automatic tool exchange apparatus having a simple construction and capable of decreasing tool exchange time.

According to this invention there is provided automatic tool exchange apparatus for exchanging tools between a tool magazine having a plurality of tool pots for receiving tools, and a spindle of a machine tool, the axis of the spindle being disposed perpendicularly to the axes of the tool pots, the apparatus comprising a tool exchange arm formed with tool holding means on both ends thereof; arm supporting means having an arm driving mechanism for rotating the tool exchange arm and reciprocating the same toward and away from a rotary shaft provided for the arm supporting means; means for swinging the arm supporting means about a pivot shaft; and means for reciprocating the arm supporting means in a direction perpendicular to the pivot shaft.

BRIEF DESCRIPTION OF THE DRAWINGS

In the accompanying drawings:

FIG. 6i through FIG. 6xix are diagrammatic representations useful to explain the operation of the first embodiment shown in FIG. 1;

DESCRIPTION OF THE PREFERRED EMBODIMENTS

Figure 1:
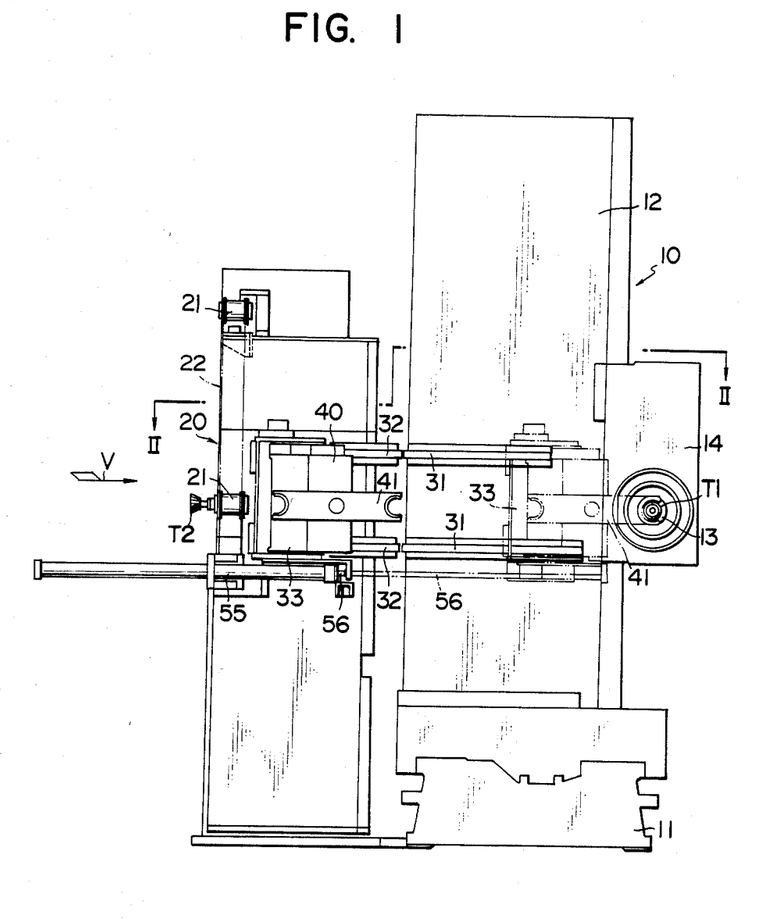
FIG. 1 is a front view showing a first embodiment of the automatic tool exchange apparatus according to this invention.
Figure 2:
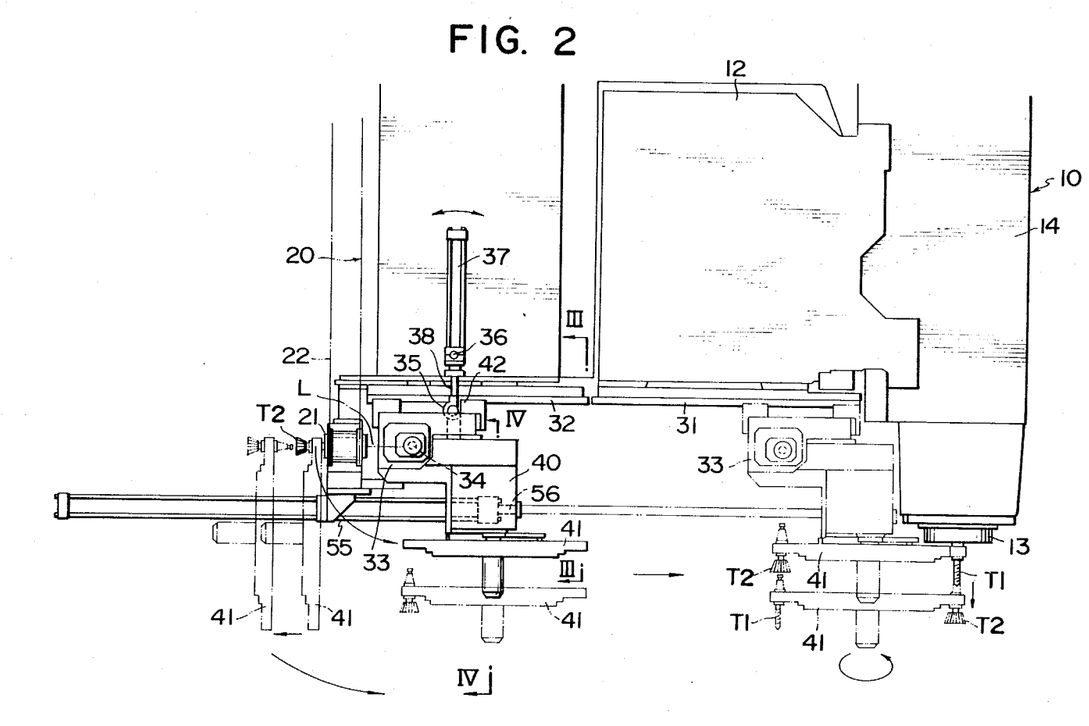
FIG. 2 is a sectional view taken along a line II—II in FIG. 1.

The first embodiment of this invention shown in FIGS. 1 and 2 comprises a machine tool 10 including a column 12 to be movable along a bed 11 in a direction perpendicular to the sheet of the drawing. A spindle head 14 having a spindle 13 is mounted on the righthand side of column 12 to be movable in the vertical direction.

On the lefthand side of column 12 is mounted a tool magazine 20 including a number of tool pots 21 each containing a tool. The tool magazine is mounted on the floor independently of the machine tool 10. The tool pots 21 are carried by a conveyor chain 22 to be successively indexed to a tool exchange position (see FIG. 5). The tool pots 21 are disposed with their axes perpendicular to the axis of the spindle 13.

A pair of horizontal guide rails 31 are secured to the upper and lower ends of column 12 on the front wall of the column 12 on which the spindle head 14 is mounted. A pair of horizontal guide rails 32 are mounted on the front surface of tool magazine 20 to extend in the same direction as the guide rails 31 with predetermined gaps therebetween. These guide rails 31 and 32 extend between a position near spindle 13 and the lefthand end of tool magazine 20.

Figure 3:
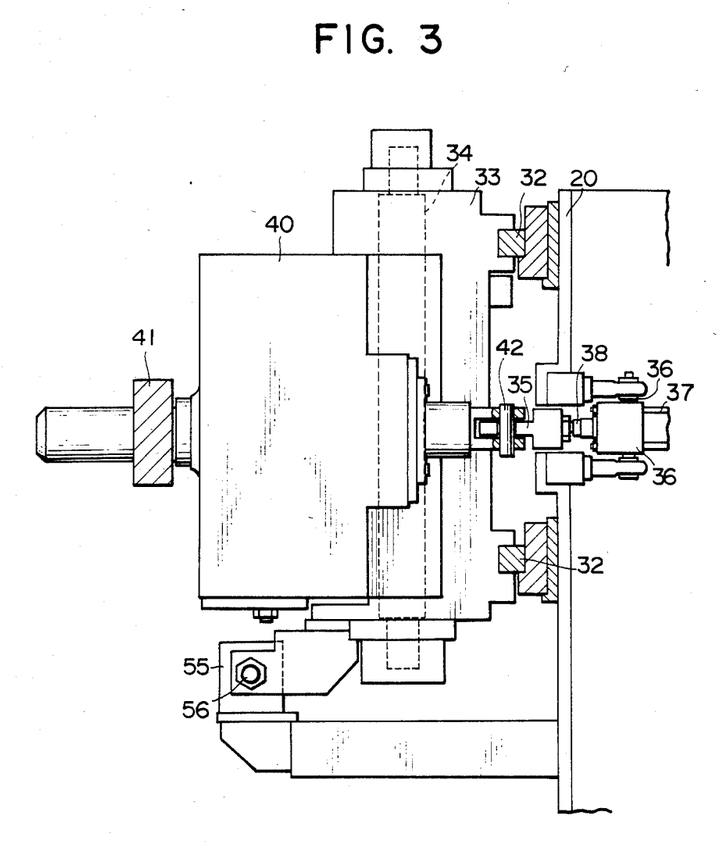
FIG. 3 is a sectional view taken along a line III—III in FIG. 2.

There are also provided a carriage 33 movable along guide rails 31 and 32, and an arm supporting device 40 which rotatably supports a tool exchange arm 41 having tool gripping members on both ends and reciprocates the arm 41 in the axial direction of the rotary shaft of the arm 41. The opposite ends of the arm supporting device 40 are swingably mounted on carriage 33 by means of pivot pins 34. As shown in FIG. 3, to the rear surface of the arm supporting device 40 is secured a pin 42 in a direction perpendicular to the directions of guide rails 31 and 32 to project to a point near substantially the middle point between guide rails 32. The pin 42 extends through a hook 35 with its notch directed toward the spindle 13. The hook 35 is secured to one end of the piston rod 38 of an oil pressure cylinder 37 mounted on tool magazine 20 through a pin 36 to be swingable in the horizontal direction.

The opposite ends of pivot pins 34 are rotatably supported by carriage 33 and the pivot pins are arranged on an extension L of the axis of a tool pot 21 of the tool magazine indexed to the tool exchange position as shown in FIG. 2.

Figure 4:
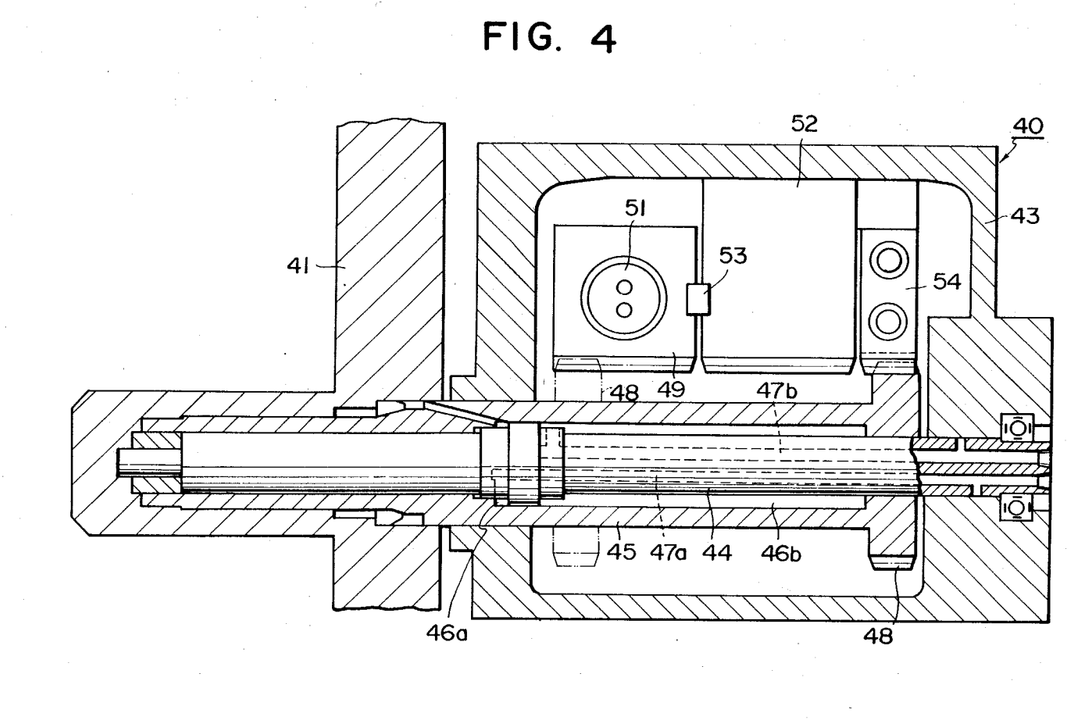
FIG. 4 is a sectional view taken along a line IV—IV in FIG. 2.

FIG. 4 shows detailed construction of the arm supporting device 40 which comprises a casing 43, a stationary shaft 44 contained therein with one end projected to the outside thereof, and a hollow shaft 45 rotatably and reciprocatably mounted on the stationary shaft 44, the hollow shaft 45 supporting tool exchange arm 41. Between stationary and rotary shafts 45 and 44 are formed two sealed spaces 46a and 46b for permitting axial movement for the hollow shaft 45 and two pressurized oil passages 47a and 47b formed through the stationary shaft 44 open into spaces 46a and 46b, respectively. A spur gear 48 is integrally formed at one end of hollow shaft 48.

Further, a mechanism for swinging the hollow shaft 45 is contained in the casing 43. More particularly, a rack 49 movable in a direction perpendicular to the sheet of drawing is provided for engaging with the spur gear 48 when the hollow shaft 45 is advanced (to the leftside as viewed in FIG. 4). The rack 49 is moved by an oil pressure actuator 51 and the side surface of the rack 49 is guided by a guide key 53 provided for a pinion guide 52. The purpose of the pinion guide is to cause the spur gear 48 to correctly engage rack 49 when the hollow shaft 45 is advanced. The pinion guide 52 is secured to the casing 43. A swinging rack 54 meshing with spur gear 48 when the hollow shaft 45 is retracted is mounted on the pinion guide 52 via a dish spring, not shown, so that the swinging rack 54 can move slightly in a direction normal to the sheet of drawing.

As shown in FIGS. 1 and 2, an oil pressure cylinder 55 is provided for reciprocating carriage 33, the piston rod 56 thereof extending in parallel with guide rails 31 and 32 toward spindle 13 to be connected with tool magazine 20. The righthand end of piston rod 56 is connected to the lower end of carriage 33.

Figure 6:
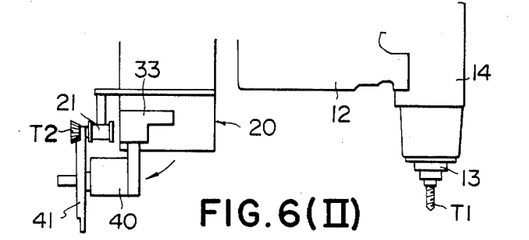
Figure 6I:
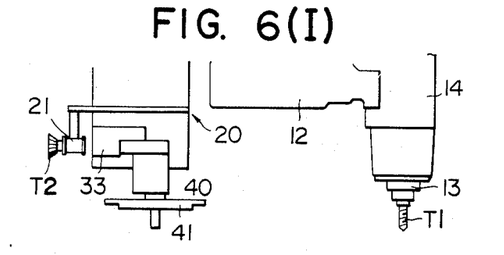

The operation of this invention will now be described with reference to FIG. 2 and FIGS. 6i–6xiv.

In a state shown in FIGS. 2 and 6i the operation of removing a used tool T1 on spindle 13 and then mounting a new tool T2 taken out from the tool magazine 20 on the spindle will be described. The term "tool" used therein means any type of tool held by a tool holder having a taper shunk mounted on the tool magazine. Accordingly, a term "tool exchange" means exchange of tool holders.

In response to a tool exchange instruction, one of the tool pots 21 containing desired tool T2 is indexed to the tool exchange position. As shown in FIG. 1, the axis of the tool pot indexed to the tool exchange position lies in the same horizontal plane as the axis of the spindle 13.

Then oil pressure cylinder 37 is actuated to push out piston rod 38 so that pin 42 on the back surface of arm supporting device 40 is pushed by hook 35 for swinging arm supporting member 40 about pivot shaft 34 toward tool magazine 20 (see FIG. 6ii). Since the oil pressure cylinder 37 is mounted by pin 36 to be swingable in the horizontal direction, the push out operation of the piston rod 38 for swinging arm supporting device 40 can be effected smoothly.

Figure 5:
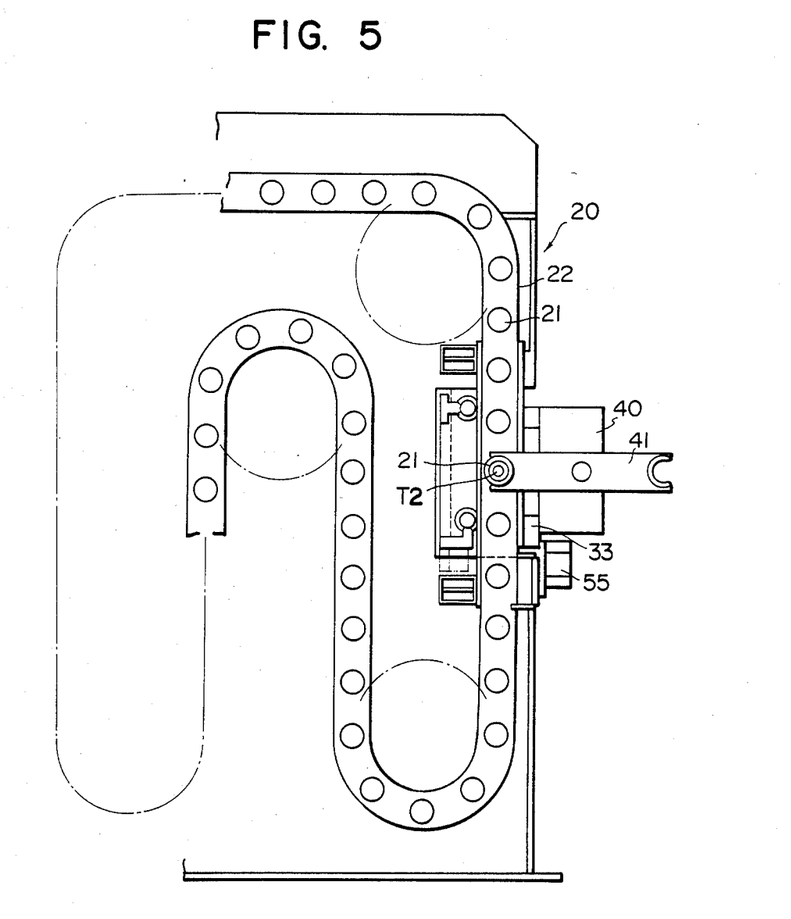
FIG. 5 is a side view of the apparatus shown in FIG. 1 as seen in the direction of arrow V.

The arm supporting device 40 is swung 90° toward the tool magazine 20 so that a tool holding member at one end of the tool exchange arm 41 engages tool T2 contained in the tool pot 21 which has been indexed to the tool exchange position as shown in FIG. 5. The spur gear 48 integral with the hollow shaft 45 meshes with swinging rack 54 for permitting a small swinging motion to the tool exchange arm 41, thus smoothly engaging tool holder against tool T2. (see FIG. 4)

When tool T2 is held by tool exchange arm 41, pressurized oil is supplied to sealed space 46a in the hollow shaft 45 through oil passage 47a to push out hollow shaft 45 along stationary shaft, thereby advancing tool exchange arm 41 toward shaft 45 (see FIG. 6iii). By the forward motion of the tool exchange arm 41, tool T2 is withdrawn from tool pot 21.

Upon retraction of the piston rod 38, pin 42 would be pulled by hook 35 so that the arm supporting device 40 would be swung 90° in the opposite direction about pivot pin 34 as shown in FIG. 6iv.

Figure 6V:
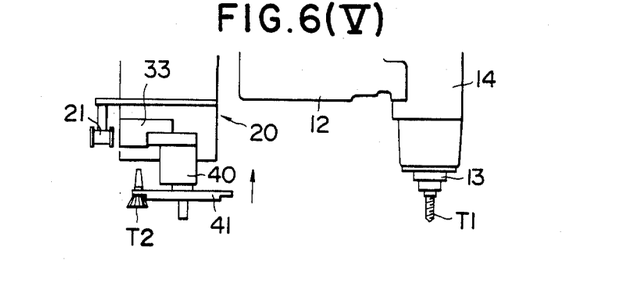

Then pressurized oil is supplied to sealed space 46b in the hollow shaft 45 through oil passage 47b for retracting hollow shaft 45 and tool exchange arm 41 (see FIG. 6v).

Then oil pressure cylinder 55 is actuated to push out piston rod 56 for moving carriage 33 toward spindle 13 along guide rails 32 and 31 (see FIG. 2). To enable the movement of carriage 33, the column 12 should be moved on bed 11 to a position at which guide rail 31 aligns or becomes continuous with guide rail 32 on the side of tool magazine 20. As carriage 33 approaches a position 33a near spindle 13, the idle end of the tool exchange arm 41 engages tool T1 on the spindle 13 from lateral side. (FIG. 6vi)

When the tool exchange arm is advanced under this condition, tool T1 which has been mounted on spindle 13 is dismounted and then held by the opposite end of tool exchange arm 41 (FIG. 6vii).

As the rack 49 is moved in the direction perpendicular to the sheet of drawing by actuating oil pressure actuator 51, the spur gear 48 of hollow shaft 45 meshing with rack 49 is rotated so as to rotate the tool exchange arm 41 about stationary shaft 44 by 180° (FIG. 6viii).

As the tool exchange arm 41 is retracted again, the tapered shank of the new tool T2 held by one end of the tool exchange arm 41 is inserted into the spindle to be secured thereto as shown in FIG. 6ix by clamping a pull stud, for example.

Figure 6X:
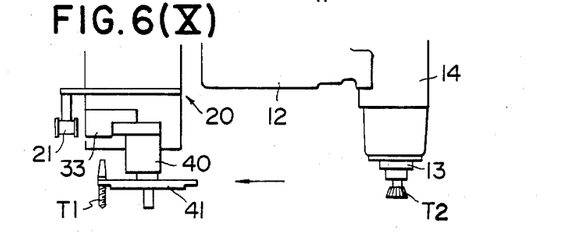

Then when piston rod 56a is retracted by operating oil pressure cylinder 55, the carriage 33 is moved toward the tool magazine for releasing the new tool T2 from tool exchange arm 41, thus completing the mounting operation of the new tool T2 onto spindle 13 (see FIG. 6x).

After carriage 33 has been transferred onto guide rail 32 after being moved toward tool magazine 20, ram 12 and spindle head 14 are moved to definite positions for starting machining of a workpiece with the new tool T2.

As the carriage 33 is moved to a predetermined end position of tool magazine 20, pin 42 on the rear surface of the arm supporting device 40 engages hook 35 from lateral direction.

By the following operation, used tool T1 is housed in tool magazine 20.

Thus, hollow shaft 45 is actuated to advance tool exchange arm 41 as shown in FIG. 6xi. Then oil pressure cylinder 37 is actuated to swing 90° the arm supporting device 40 about pivot shaft 34 toward the tool magazine (see FIG. 6xii). Then as the tool exchange arm 41 is retracted, the tapered shank of tool T1 held by the tool exchange arm is inserted into a corresponding tool pot and clamped by suitable means (FIG. 6xiii). After that, when piston rod 38 of the oil pressure cylinder 37 is retracted, the arm supporting device 40 is swung back to the position shown in FIG. 2 (see FIG. 6xiv). At this time tool T1 is released from the tool exchange arm 41, whereby housing of the used tool T1 in the tool magazine 20 is completed.

A series of operations described above are controlled by an ordinary sequence control system.

For swinging the arm supporting device 40 a suitable driving mechanism can be used. For example, a pinion is secured to pivot pin 24 and a rack meshing with the pinion is driven by an oil pressure actuator for rotating the pivot pin 34. Further, for moving the carriage 33, instead of directly driving the carriage by the oil pressure cylinder 55, a gear or chain mechanism can be used. Where the spindle head 14 is located on the lefthand side of column 12 as seen in FIGS. 1 and 2, guide rail 31 on the side of the machine tool can be omitted.

Although in this embodiment the guide rails for moving the carriage are mounted on the front walls of the tool magazine and of the column of the machine tool for inserting tools in the tool pots by utilizing 90° swinging motion of the arm supporting device, the same object can be accomplished by mounting the guide rails on the side surface of the tool magazine or of the column for moving the carriage and the arm supporting device in parallel with the spindle, thereby mounting the tool on the spindle by utilizing 90° swinging of the arm supporting device. This embodiment is advantageous for a case wherein the spindle is located on the side of the tool magazine or for a gate type machine tool having two columns.

Figure 7:
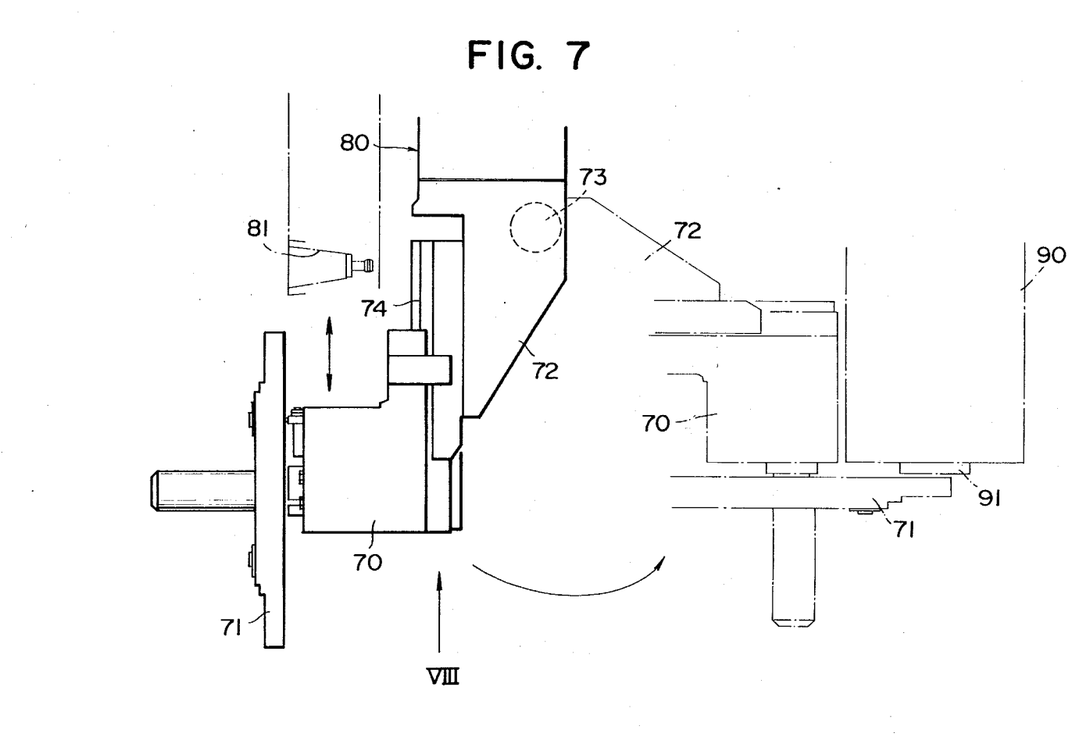
FIG. 7 is a side view showing essential elements of a second embodiment of this invention.
Figure 8:
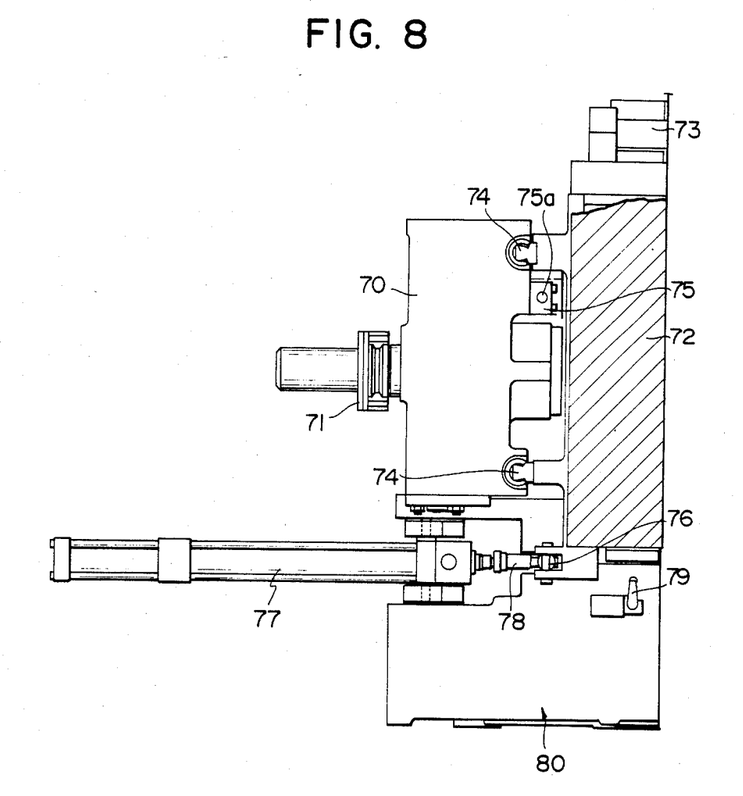
FIG. 8 is an end view, partly in section, of the second embodiment shown in FIG. 7 as viewed in the direction of arrow VIII in FIG. 7.

FIGS. 7 and 8 illustrate a second embodiment of this invention which is different from the first embodiment in that the spindle is positioned near the tool magazine so that the distance of linear reciprocation of the arm supporting device is short. In these figures, there is provided an arm supporting device 70 rotatably and reciprocatably supporting the tool exchange arm 71 formed with tool holding members with their ends opened in the radial direction. The rotating mechanism and the reciprocating mechanism of the tool exchange arm 71 contained in the arm supporting device 70 are similar to those of the first embodiment so that the description regarding the construction and operation of the mechanisms will not be repeated.

The arm supporting device 70 is mounted on a supporting member 72 to be linearly reciprocatable and swingable by 90° through a pivot pin 73 at one corner of the arm 72. A pair of parallel guide rails 77 are secured to the bottom of supporting member 72 for slidably supporting the arm supporting device 70. Between a pair of parallel guide rails 74 is disposed an oil pressure cylinder with its piston rod (not shown) connected to the arm supporting device 70 for reciprocating the same.

A pin 76 is secured to the lower end of supporting member 72 for loosely supporting one end of the piston rod 78 of an oil pressure cylinder 77 to be swingable over an angle of 90°, whereby the oil pressure cylinder 77 is mounted on the tool magazine to be swingable in the horizontal direction. As shown in FIG. 8, a switch 79 is provided to detect the waiting position (to be described later) of the arm supporting device 70.

Figure 9:
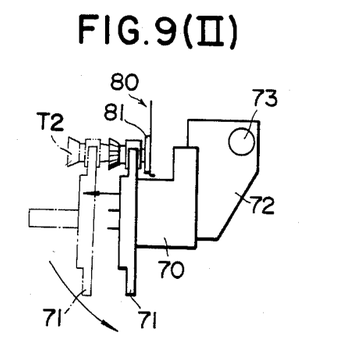
FIG. 9i through 9x are diagrammatic representations useful to explain the operation of the second embodiment shown in FIG. 7.

The operation of the second embodiment will be described with reference to FIGS. 9i–9x.

Figure 9I:
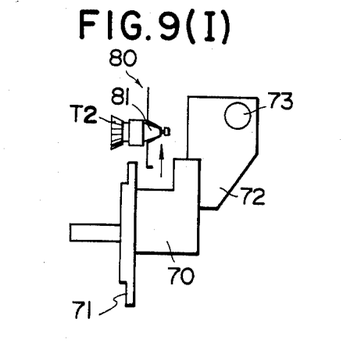

FIGS. 9i–9iii show a tool selection step in which a new tool is selected and held and then moved to an intermediate or waiting position. More particularly, when a selection instruction of a new tool 72 is issued as shown in FIG. 9i, the tool magazine 80 is operated to index the new tool T2 to the tool exchange position. Then, as shown in FIG. 9ii, the arm supporting device 70 is moved along supporting member 72 in the direction of an arrow for causing one end of the tool exchange arm 71 to engage and hold the new tool T2. The tool exchange arm 71 is advanced toward the rotary shaft for taking out the new tool T2 from a corresponding tool pot 81 of the tool magazine.

Then as shown in FIG. 9iii, the piston rod 78 of oil pressure cylinder 77 advances for swinging by 45° the supporting member 72 about pivot pin 73, and the tool exchange arm 71 is retracted toward the rotary shaft for waiting the next step while holding the new tool T2 in a state shown in FIG. 9iii.

When an exchange instruction of the used (old) tool T1 is issued, the piston rod 78 of oil pressure cylinder 77 is advanced for further swinging 45° the supporting member 72 from the waiting position as shown in FIG. 9iv.

Figure 9V:
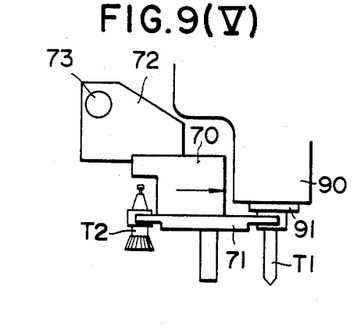
Figure 9X:
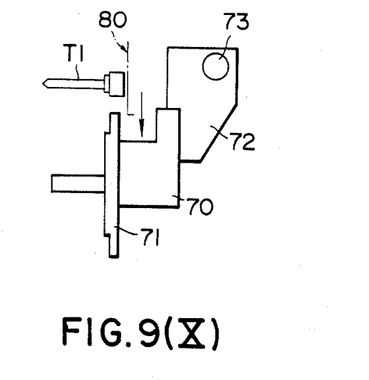

Then the piston rod 75a of the oil pressure cylinder 75 is actuated for linearly moving the arm supporting device 70 toward the spindle head along the guide rails 74, whereby one end of the tool exchange arm 71 is caused to engage the old tool T1 on the spindle 91 from lateral side as shown in FIG. 9v.

As the tool exchange arm 71 is advanced under this state the old tool T1 on the spindle 91 would be withdrawn. After supporting new and old tools T2 and T1 with the opposite ends of the tool exchange arm 71, it is rotated by 180° as shown in FIG. 9iv. Then the arm 71 is retracted for mounting the new tool T2 on the spindle 91 and after clamping the new tool by a clamping device, not shown, in the spindle head 90, the arm supporting device 70 is moved away from the spindle head 90 along supporting member 72 as shown in FIG. 9vii.

Then as shown in FIG. 9viii, the oil pressure cylinder 77 is actuated to swing supporting member 72 by 45° and to advance the tool exchange arm 71. At this stage, mounting of the new tool T2 on spindle 91 is completed and the machine tool is ready for machining with the new tool T2.

The old tool T1 held by the tool exchange arm 71 is inserted into a corresponding pot 81 of the tool magazine 80 by further swinging supporting member 72 by 45° to align the axis of the old tool with the axis of the pot 81 and then retracting the tool exchange arm 71 (see FIG. 9ix). Then the arm supporting device 70 is moved away from the tool magazine 80 along supporting member 72 for releasing the old tool T1 from the tool exchange arm 71.

The tool exchange operation of this embodiment is completed by the series of steps described above.

According to this embodiment, since the are supporting device is mounted on the swinging supporting member to be reciprocatable with respect thereto, guide rails 31 and 32 utilized in the first embodiment are not necessary.

This modification is especially suitable for a case wherein the spindle and the tool magazine are closely disposed as in a gate column type machine tool.

Although in this embodiment, a tool pot address system (fixed address system) was adopted for selecting a specific tool, where a random address selection system is used, the tools can be exchanged directly without using the waiting position of the tool exchanging arm (FIGS. 9iii and 9viii).

As above described, according to this invention, where the tool magazine is disposed with the axes of its tool pots directed to intersect perpendicularly with the axis of the spindle of a machine tool, the tool can be grasped directly by merely swinging the tool exchange arm without providing an intermediate arm and an intermediate pot or a mechanism for swinging the tool pots by 90°. This not only simplifies the construction of the tool exchange mechanism and shortens the tool exchange time but also simplifies the tool exchange operation as well as the control circuit thereof.

What is claimed is:

1. Automatic tool exchange apparatus for exchanging tools between a tool magazine having a plurality of tool pots for receiving tools, and a spindle of a machine tool, an axis of said spindle being disposed perpendicularly to the axes of said tool pots, said tool exchange apparatus comprising:

a tool exchange arm formed with tool holding means on both ends thereof;

arm supporting means having an arm driving mechanism for rotating said tool exchange arm and reciprocating the same toward and away from a shaft provided for said arm supporting means;

a carriage for swingably supporting said arm supporting means about said shaft;

means for moving said carriage between said tool magazine and said spindle along guide rails; and arm swinging means provided with a pin on a back surface of said arm supporting means, and an oil pressure cylinder mounted on said tool magazine and including a piston rod, and hook member mounted on an outer end of said piston rod for removably engaging said pin.

2. The automatic tool exchange apparatus according to claim 1 wherein the axis of the shaft about which said arm supporting means pivots is disposed perpendicularly to the axis of a tool pot of said tool magazine indexed to a tool exchange position.

* * * * *